(12) United States Patent
Patange et al.

(10) Patent No.: US 12,526,269 B2
(45) Date of Patent: Jan. 13, 2026

(54) IIoT CROSS-DOMAIN AUTHENTICATION USING IDENTITY FEDERATED SMART CONTRACTS

(71) Applicant: Rockwell Automation Technologies, Inc., Mayfield Heights, OH (US)

(72) Inventors: Nikhil Ashok Patange, Pune (IN); Francisco P Maturana, Lyndhurst, OH (US); Krutika Kansara, Maharashtra (IN)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 252 days.

(21) Appl. No.: 18/460,913

(22) Filed: Sep. 5, 2023

(65) Prior Publication Data
US 2025/0080521 A1 Mar. 6, 2025

(51) Int. Cl.
*H04L 9/40* (2022.01)
*H04W 12/084* (2021.01)
(52) U.S. Cl.
CPC ....... *H04L 63/0815* (2013.01); *H04W 12/084* (2021.01)
(58) Field of Classification Search
CPC .................................................. H04L 63/0815
See application file for complete search history.

(56) References Cited

U.S. PATENT DOCUMENTS

| 10,057,264 | B1* | 8/2018 | ElNakib | H04L 63/102 |
| 2017/0214529 | A1* | 7/2017 | Barbosa E Oliveira | ..... |
| | | | | H04L 9/3247 |
| 2018/0359621 | A1* | 12/2018 | Singhal | H04L 67/51 |
| 2019/0044953 | A1* | 2/2019 | Holsinger | H04W 4/021 |
| 2019/0333054 | A1* | 10/2019 | Cona | H04L 9/3297 |
| 2022/0150256 | A1* | 5/2022 | Kapoor | G06F 21/6218 |
| 2023/0177494 | A1* | 6/2023 | Davis | G06Q 30/0207 |
| | | | | 705/69 |

OTHER PUBLICATIONS

Clack et al., "Smart Contract Templates: foundations, design landscape and research directions", Mar. 2017, Barclays Bank PLC, pp. 1-15. (Year: 2017).*

* cited by examiner

*Primary Examiner* — William S Powers
(74) *Attorney, Agent, or Firm* — Amin, Turocy & Watson, LLP

(57) ABSTRACT

Identity-federated smart contracts can be combined with an identity provider to provide uniform, customizable, secure, and immutable authentication across many different domains. Such can address the challenges of cross-domain authentication in the context of a decentralized environment such as a decentralized IIoT environment in which a host application resident in a host domain can functionally integrate with, and potentially be bundled or packaged as a single product, many remote applications that reside in many different (e.g., customer) domains that use different forms of authentication, and where some domains may have no authentication mechanisms at all.

20 Claims, 14 Drawing Sheets

IIoT CROSS-DOMAIN AUTHENTICATION USING IDENTITY FEDERATED SMART CONTRACTS

TECHNICAL FIELD

The subject matter disclosed herein relates generally to industrial Internet-of-things (IIoT) systems, and, for example, providing secure access for industrial data or resources.

BACKGROUND

In various technological fields, cross-domain authentication solutions are known, such as single sign-on (SSO) techniques, cloud services techniques, or enterprise security techniques. SSO techniques are generally directed to prompting a user to log in once by entering credentials and access multiple systems without re-entering additional credentials. Certain cloud services techniques provide cross-domain authentication by authenticating a user to a particular cloud service, generally via protocols such as security assertion markup language (SAML) and/or open authorization (OAuth). Enterprise security solutions for cross-domain authentication can be used to allow employees to access internal resources using existing corporate credentials, generally via protocols such as Kerberos, lightweight directory access protocol (LDAP), or Active Directory.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising an application interface component. The application interface component can be configured to interface with remote applications from multiple different domains. The remote applications can be further be configured to functionally integrate with a host application (e.g., in a host domain). The remote applications can comprise a first application of a first domain that utilizes a first authentication protocol and a second application of a second domain that utilizes a second authentication protocol.

The system can further comprise an identity provider component. The identity provider component can be configured to receive registration data that can be indicative of information to register the first application to functionally integrate with the host application. The identity provider component can further be configured to interface with a smart contract component. The smart contract component can be configured to generate smart contracts by adding at least a portion of the registration data to a smart contract block chain. Based on the smart contracts, the identity provider component can be configured to provide, to the first application, authentication tokens that support authenticated access across the multiple different domains.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
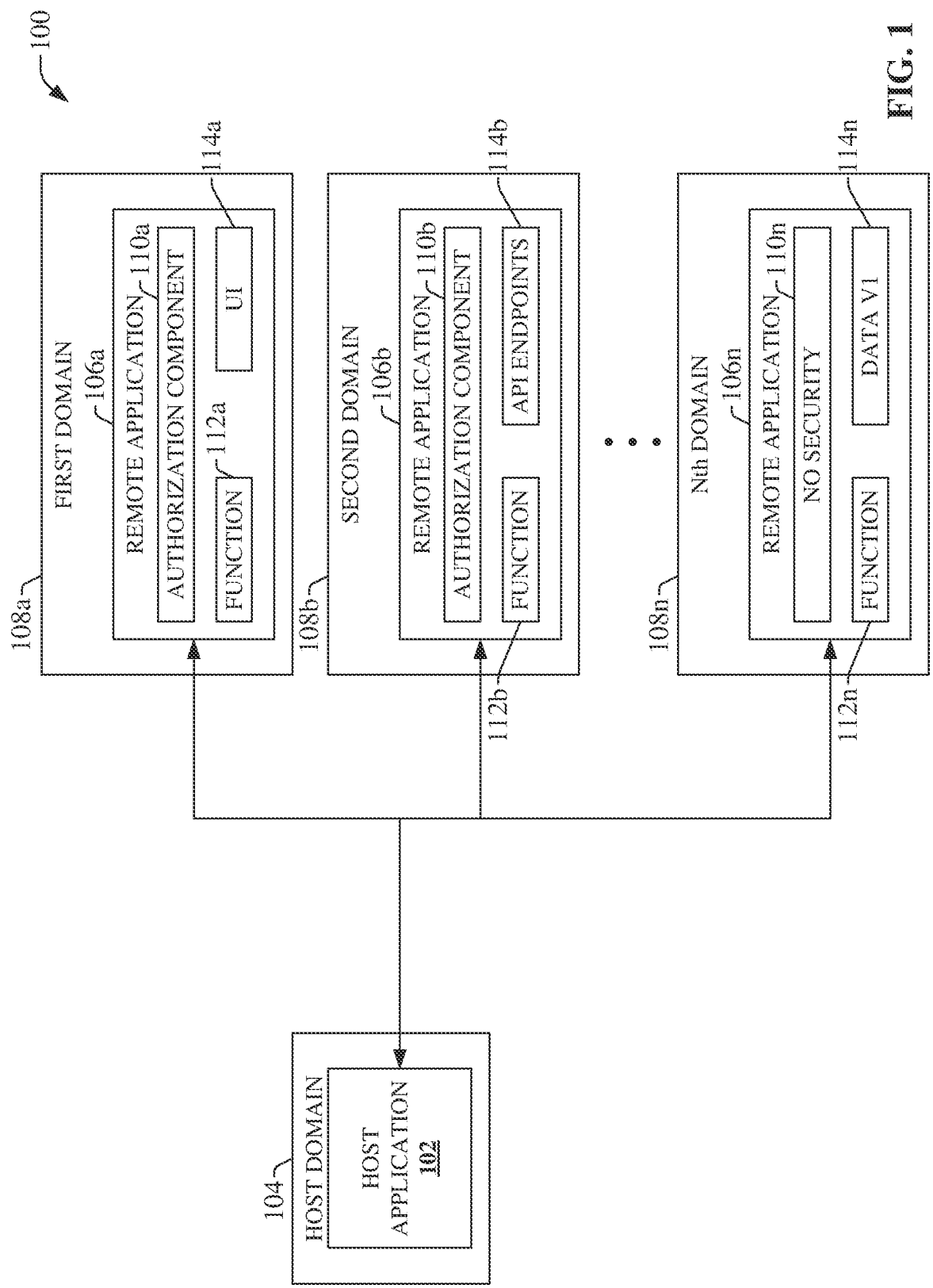
FIG. 1 depicts a schematic block diagram 100 illustrating an example host application that functionally integrates with multiple different remote applications in accordance with certain embodiments of this disclosure.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

Overview

As noted in the Background section, certain cross-domain authentication schemes exist, such as SSO, certain authentication cloud services, and certain enterprise security techniques. However, previous solutions fail to address the cross-domain authentication challenges that exist for current and future IIoT systems. For example, existing cross-domain authentication systems are highly centralized in nature, which can introduces a single-point-of-vulnerability and can limit access to domains or resources that are beyond the central authority and/or can mandate significant increases in management complexity. Furthermore, existing solutions have no ability to authenticate entities (e.g., applications) that have a lower level (or no security mechanism at all) or different security mechanisms in place.

Such can be particularly problematic in the context of IIoT systems, which is illustrated with reference to FIG. 1. FIG. 1 depicts a schematic block diagram 100 illustrating an example host application that functionally integrates with multiple different remote applications in accordance with certain embodiments of this disclosure.

A rising trend in IIoT application development relates to a switch from applications being developed by a single team in a single domain to many integrated applications being developed by separate teams in many different domains. Furthermore, with the rollout of Industry 5.0, decentralized applications will be common. These decentralized applications can be from many different domains, with each potentially utilizing a different security protocol, or in some cases, some of these domains may not even have a security mechanism at all.

In this example, host application 102 can reside in host domain 104, which can be a domain representative of a host platform for an IIoT system. As one example, host domain 104 can, inter alia, allow upload of hardware inventory and user data from customer edge sites, e.g., for product registration. Host application 102 can functionally integrate with many different decentralized remote applications 110, which are illustrated here as remote applications 106a-106n, where n can be any whole number. Further each remote application 106 can belong to a different domain 108, illustrated here as domains 108a-108n, and may have any type of authorization component 110a-110b, including cases where a given domain 108 or remote application 106 does not use any security mechanism(s), which is shown at reference numeral 110n.

In IoT and IIoT deployments, individual applications 106 can be tied to different edge gateways spread across a network, residing in different domains that communicate data to central servers via host application 102. Each remote application 106 can have distinct features or functions 112 (e.g., functions 112a-112n) and can leverage distinct resources 114, such as a UI resource 114a, an API endpoint resource 114b, a data resource 114n, and so forth.

User authentication vulnerabilities can emerge when these remote applications 106 (e.g., from different edges of different domains 108) are integrated into one bundled application. It is noted that because host application 102 and remote applications 106 can be bundled into a single packaged application, remote application 106n causes a security vulnerability because there is no application-level security present. Hence, one emerging challenge is that the cross-domain solutions used to integrate cross-domain applications—each of which can reside in a different domain 108—can suffer from security vulnerabilities that could be exploited by a malicious actor if one of the many different domains 108 lacks application-level security.

Figure 2:
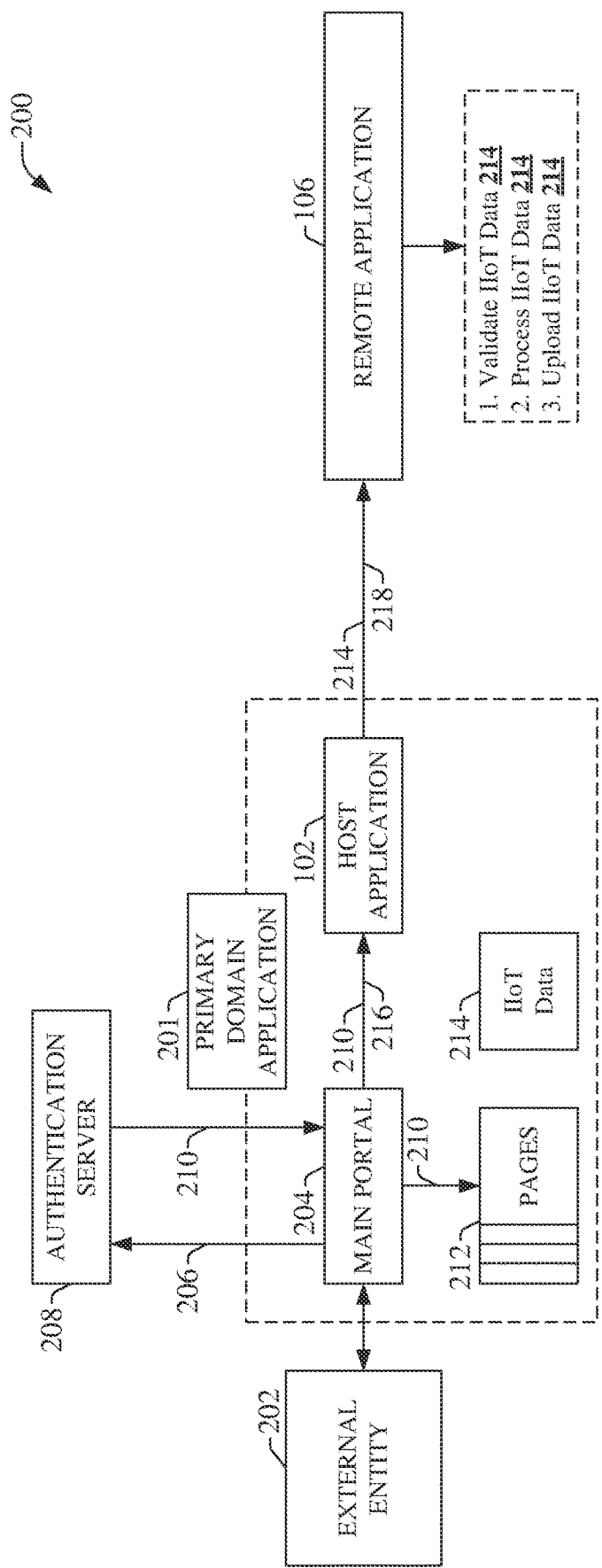
FIG. 2 depicts a schematic block diagram 200 illustrating an example host domain network architecture in greater detail in accordance with certain embodiments of this disclosure.

FIG. 2 depicts a schematic block diagram 200 illustrating an example host domain network architecture in greater detail in accordance with certain embodiments of this disclosure. For example, a primary domain application 201 can provide control or interface operations for the host domain (e.g., host domain 104). An external entity 202, such as a user, device, or application that is external to host domain 104 can initially interface with main portal 204. Thereafter, external entity 202 might want to access resources provided by host application 102 or any remote application 106.

One potential approach may be to require external entity 202 to log in at the main portal by submitting credentials such as user name and password. As indicated by reference numeral 206, these credentials can be passed on to authentication server 208 and, assuming the credentials are valid, an authentication token 210 can be returned. For example, authentication token 210 can be required to access any resources managed by domain 104 such as pages 212, host application 102, or to access or upload IIoT data 214 (e.g., to a data lake of domain 104). In each case authentication token 210 can be provided to every domain resource prior to authorizing access. As indicated by reference numeral 216, if authentication token 210 is not uniquely verified as part of an integrated bundle for host application 102, a potential security vulnerability can be exposed.

However, authentication at every step, as shown here can be cumbersome and monolithic. In contrast, Industry 5.0 systems are highly decentralized in nature. As detailed previously, each remote application 106 may use a different security mechanism than other remote applications 106. Hence, if the remote application 106 in this example uses a different protocol than is used by authentication token 210, then remote application will not be able to validate authentication token 210, causing another potential vulnerability 218.

Accordingly, as illustrated in FIGS. 1 and 2, there are two distinct challenges confronting IIoT cross-domain authentication solutions, neither of which is solved by existing schemes. First, as discussed in the context of FIG. 1, if any one of the many remote applications 106/domains 108 does not have a suitable authentication/authorization component 110 in place (e.g., to provide application-level security), then such becomes an exploitable vulnerability.

Second, a cross-domain solution where all the integrated remote applications 106 potentially residing in different respective domains 108 will typically have their own authentication/authorization components 110 in place. In the context of Industry 5.0, it can be envisioned that many thousands of devices that belong to different domains 108 or platforms and many thousands of applications (e.g., remote applications 106) that are decentralized in nature and existing on different platforms or domains 108, each potentially having distinct development teams that may select security mechanisms based on different constraints or objectives. As such, an authentication token generated in one domain may not work for another domain and vice versa.

In other words, for a cross-domain solution to work in the context of IIoT, all the involved domains will need to accept and validate the tokens received from all other domains. Such makes previous approaches monolithic and difficult to scale and maintain since each application in its respective domain will need to be given access to token-validation interfaces that may or may not be accessible to all the other domains.

In order to solve the above-mentioned challenges and to other related ends, the disclosed subject matter proposes a cross-domain, identity-federated smart contract solution that can ease authenticating the cross-domain applications. In some embodiments, the disclosed techniques can implement a central identity federation system that can be built using blockchain. This central identity-federation system can provide an authentication platform for cross-domain applications to integrate seamlessly and securely. Such can, inter alia, mitigate or avoid entirely any need for an authentication token management framework to be implemented by each individual domain, which otherwise could be a bottleneck for adoption.

In some embodiments, the disclosed techniques can rely on smart contracts that can be used to manage the cross-domain registration and authentication token management. Generally, smart contracts can be embodied as programs stored on a blockchain that run with predetermined conditions are met. Typically, smart contracts are used to automate the execution of an agreement so that all participants can be immediately certain of the outcome, without any intermediary's involvement, extra processing, added delays, or expense. As a common example, smart contracts can automate a workflow, such as by triggering an ensuing action when defined conditions are met.

As used herein, smart contracts can be leveraged for certain benefits detailed herein. For instance, smart contracts can be customizable as per domain/application needs in which features or functions of the application for consumption can be part of the smart contract. It is observed that the disclosed techniques can be supported by a blockchain engine that can add a single source of truth can records. Each cross-domain application that is registered under the identity federation name can obtain authentication tokens that will be valid across all domains within the context of the solution.

Example Systems

Figure 3:
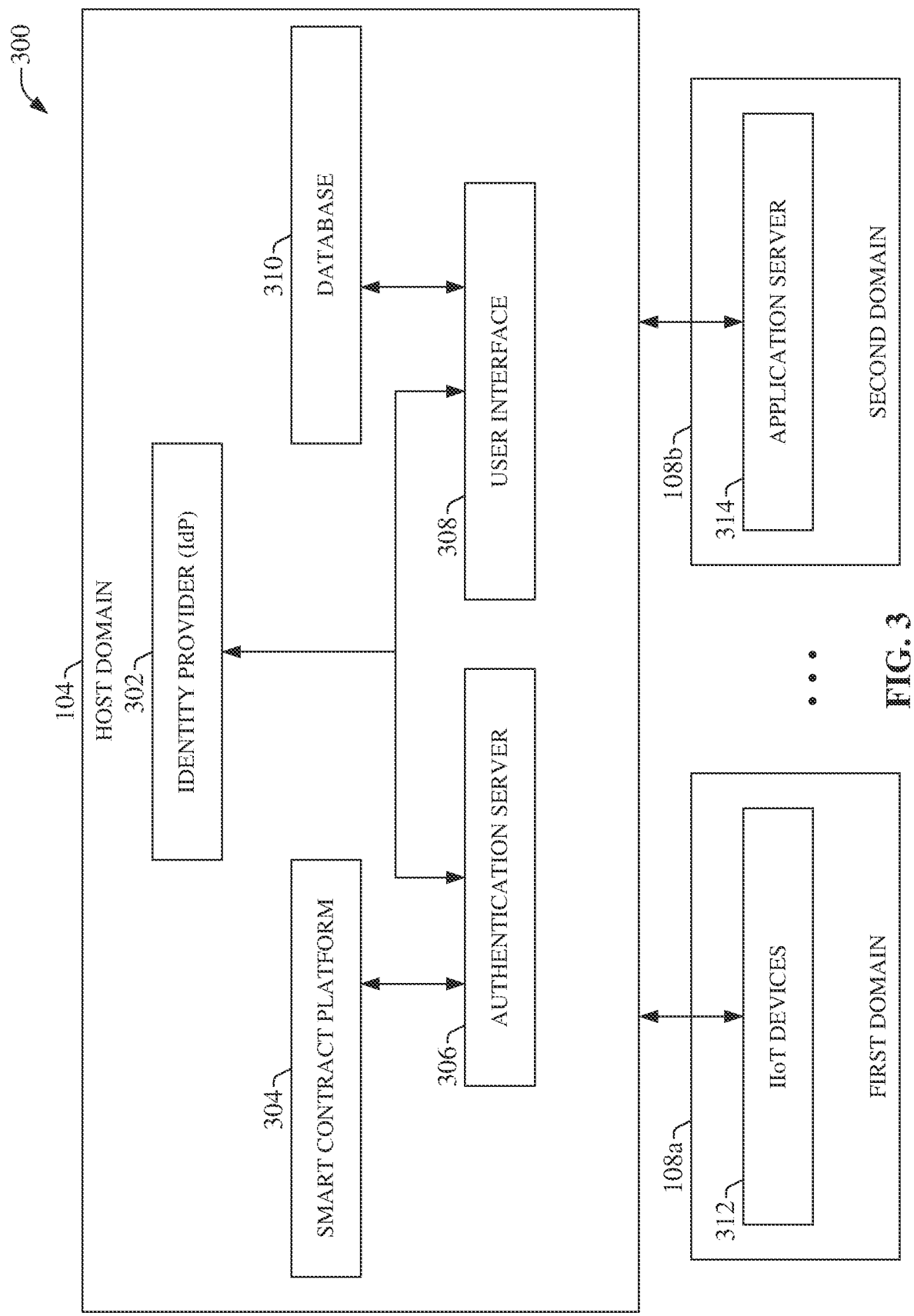
FIG. 3 depicts a schematic block diagram illustrating an example system 300 that can provide cross-domain authentication using identity federated smart contracts in accordance with certain embodiments of this disclosure.

Referring now to FIG. 3, a schematic block diagram is depicted illustrating an example system 300 that can provide cross-domain authentication using identity federated smart contracts in accordance with certain embodiments of this disclosure. For example, the disclosed techniques can relate to secure registration and authentication of IIoT devices and applications using identity federated smart contracts, which can address the challenges associated with IIoT systems, particularly in the context of Industry 5.0 in which customer or other domains are highly decentralized. In some embodiments, the term 'decentralized' can mean that that two entities are not tightly coupled and/or are decoupled from one another, e.g., such that local operations do not directly rely upon or use as input information or output from a decoupled entity.

As illustrated, system 300 can relate to a host domain such as host domain 104 that can provide industrial automation products or services and/or IIoT products or services. Host domain 104 can be communicatively coupled to many different customer or service provider domains 108, such as first domain 108a where a group of IIoT devices 312 may reside and second domain 108b where one or more application servers 314 may reside. Although not shown in system 300, it is understood that host domain 104 can also comprise host application 102 that can be functionally integrated with many remote applications 106 (e.g., see FIGS. 1 and 2) to form a bundled application.

Host domain 104 can comprise identity provider (IdP) 302. Identity provider 302 can be configured to manage or verify identities of cross-domain IIoT applications (e.g., remote applications 106) or IIoT devices 312. In keeping with the decentralized nature of Industry 5.0 standards, it can be envisioned that many instances of identity provider 302 can be deployed to form a decentralized network of identity providers 302. Addition detail relating to identity provider 302 can be found with reference to FIG. 4.

Host domain 104 can further comprise smart contract platform 304. Smart contract platform 304 can be configured to execute and manage the identities of the federated smart contracts. For example, smart contract platform 304 can manage authorization, authentication, and entity registration information. Additional detail relating to smart contract platform 304 can be found in connection with FIG. 5.

Host domain 104 can further authentication server 306, user interface 308 and database 310. Authentication server 306 can be configured to validate, authorize, or authenticate external entities that request connection to an application, service, or resource. User interface 308 can be configured to provide an interface to host domain 104 or associated sub-components or elements for external entities or, in some cases, internal entities. For example, user interface 308 can be utilized by remote applications 106 or IIoT devices 312 to perform initial registration as detailed herein. Database 310 can represent a local store to facilitate registration, validation, or other suitable tasks. In some embodiments, database 310 can be configured to support fast caching, which can aid the resource-intensive aspects of smart contracts and blockchain processing.

Figure 4:
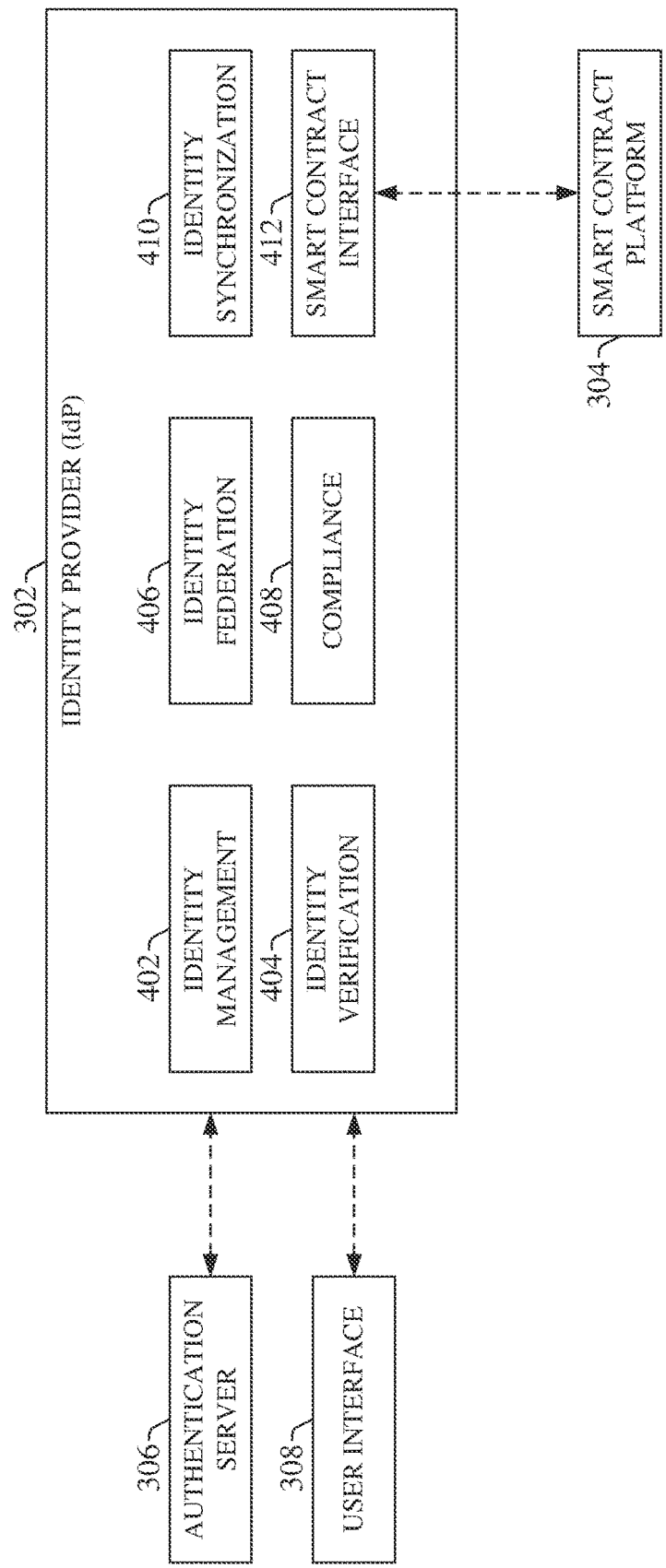
FIG. 4 depicts a schematic block diagram illustrating an example system 400 relating to further detail with respect to identity provider 302 in accordance with certain embodiments of this disclosure.

Referring now to FIG. 4, a schematic block diagram is depicted illustrating an example system 400 relating to further detail with respect to identity provider 302 in accordance with certain embodiments of this disclosure. As illustrated, identity provider 302 can be communicatively coupled to authentication server 306, user interface 308, and/or smart contract platform 304, as well as other suitable elements, components, or entities of host domain 104. As previously mentioned, holistically, identity provider 302 can operate to provide a uniform authentication mechanism capable of managing and verifying cross-domain applications, devices, or other entities.

Identity provider 302 can comprise identity management component 402. Identity management component 402 can be configured for managing or storing identity information for various entities such as devices or users. For example, identity management component 402 can perform operations or functions such as registration, authentication, or de-registration.

Identity provider 302 can further comprise identity verification component 404. Identity verification component 404 can be configured for verifying the identities of various entities such as devices or users. To these and other related ends, in some embodiments, identity verification component 404 can perform such operations by leveraging digital certificates, biometrics, multi-factor authentication or other suitable techniques to verify identities.

Identity provider 302 can further comprise identity federation component 406. Identity federation component 406 can be configured for federating the identities of various entities, such as devices or users, across multiple domains. To these and other related ends, in some embodiments, identity federation component 404 can perform such operations by leveraging various protocols such as security assertion markup language (SAML), open authorization (OAuth), and/or OpenID Connect in order to allow the various entities to access resources in other domains in a manner that is supported by those other domains.

In more detail, identity federation component 406 can handle the many different protocols and token IDs utilized to connect to all the devices, applications, or other resources or entities. Hence, identity federation component 406 can have access to any suitable information about authentication protocols that will be used by associated devices or applications. A smart contract allows these elements to be customized so that there the various different security protocols employed by any given remote application 106 can be handled. A given application or device or other entity can be registered at host domain 104 and the lifecycle of any suitable token or certificate can be managed thereafter. Thus, in one sense, any disparate type of security mechanism, or even cases where a given domain does not have a suitable security mechanism, can be created or translated via federated smart contracts.

Identity provider 302 can further comprise compliance component 408. Compliance component 408 can be configured for ensuring that identity provider 302 meets industry regulations and standards for data protection and identity management. To these and other related ends, in some embodiments, compliance component 408 can, for example, provide logging and auditing functionality as well as encryption, access control, or other security features or elements.

Identity provider 302 can further comprise identity synchronization component 410. Identity synchronization component 410 can be configured for synchronization the identities of the various entities across multiple domains and systems. To these and other related ends, in some embodiments, identity synchronization component 410 can perform such operations by leveraging various protocols such as lightweight directory access protocol (LDAP), active directory, or another suitable protocol in order to ensure that the identities are consistent across all domains, platforms, or organizations.

Identity provider 302 can further comprise smart contract interface component 412. Smart contract interface component 412 can be configured for communicating with smart contract platform 304 and executing smart contracts that create and manage the various identities on a smart contract blockchain. To these and other related ends, in some embodiments, smart contract interface component 412 can utilize application programming interfaces (APIs), a software development kit (SDK), or another suitable technique to interact with smart contract platform 304.

Figure 5:
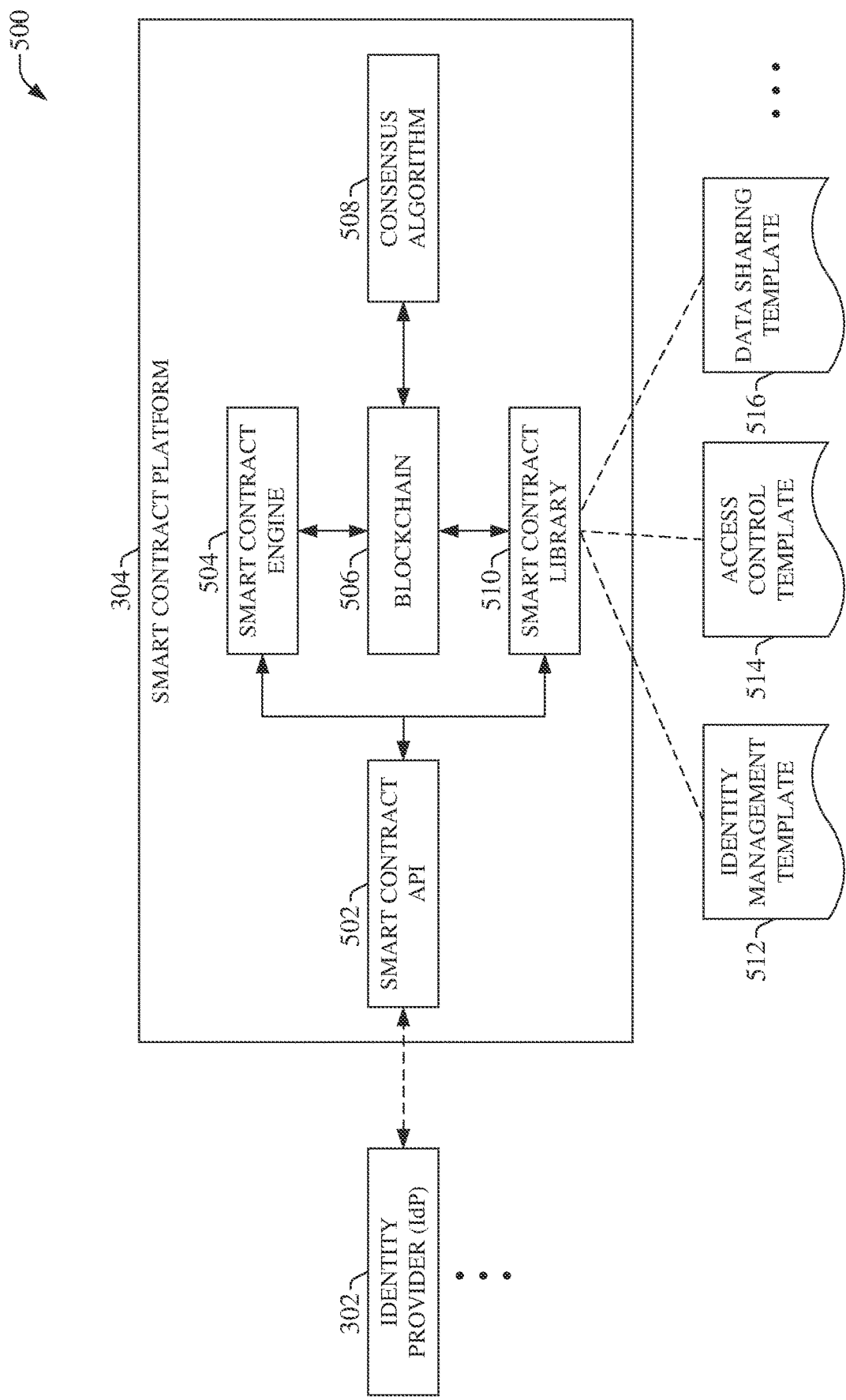
FIG. 5 depicts a schematic block diagram illustrating an example system 500 relating to further detail with respect to smart contract platform 304 in accordance with certain embodiments of this disclosure.

Referring now to FIG. 5, a schematic block diagram is depicted illustrating an example system 500 relating to further detail with respect to smart contract platform 304 in accordance with certain embodiments of this disclosure. As illustrated, smart contract platform 304 can be communicatively coupled to identity provider 302, as well as other suitable elements, components, or entities of host domain 104. As previously mentioned, holistically, smart contract platform 304 can be configured to execute and/or manage the various federated identities of the smart contracts.

Smart contract platform 304 can comprise smart contract API component 502. Smart contract API component 502 can be configured to interface with smart contract engine 504, smart contract library 508 or other suitable elements of smart contract platform 304. Hence, smart contract API component 502 can provide an interface for accessing resources or services of smart contract platform.

Smart contract platform 304 can comprise smart contract engine 504. Smart contract engine 504 can be configured to add data to blockchain 506, which can be subsequently managed or validated via consensus algorithm 508. Additionally, smart contract platform 304 can comprise smart contract library 510. Smart contract library 510, along with smart contract engine 504 can effectively tailor or customize the information that gets added to blockchain 506. Such can be facilitated via various templates, such as identity management template 512, access control template 514, data sharing template 516, or another suitable template. Templates 512-516 can be specifically configured to meet the challenges associated with cross-domain authentication in an IIoT environment.

Figure 6:
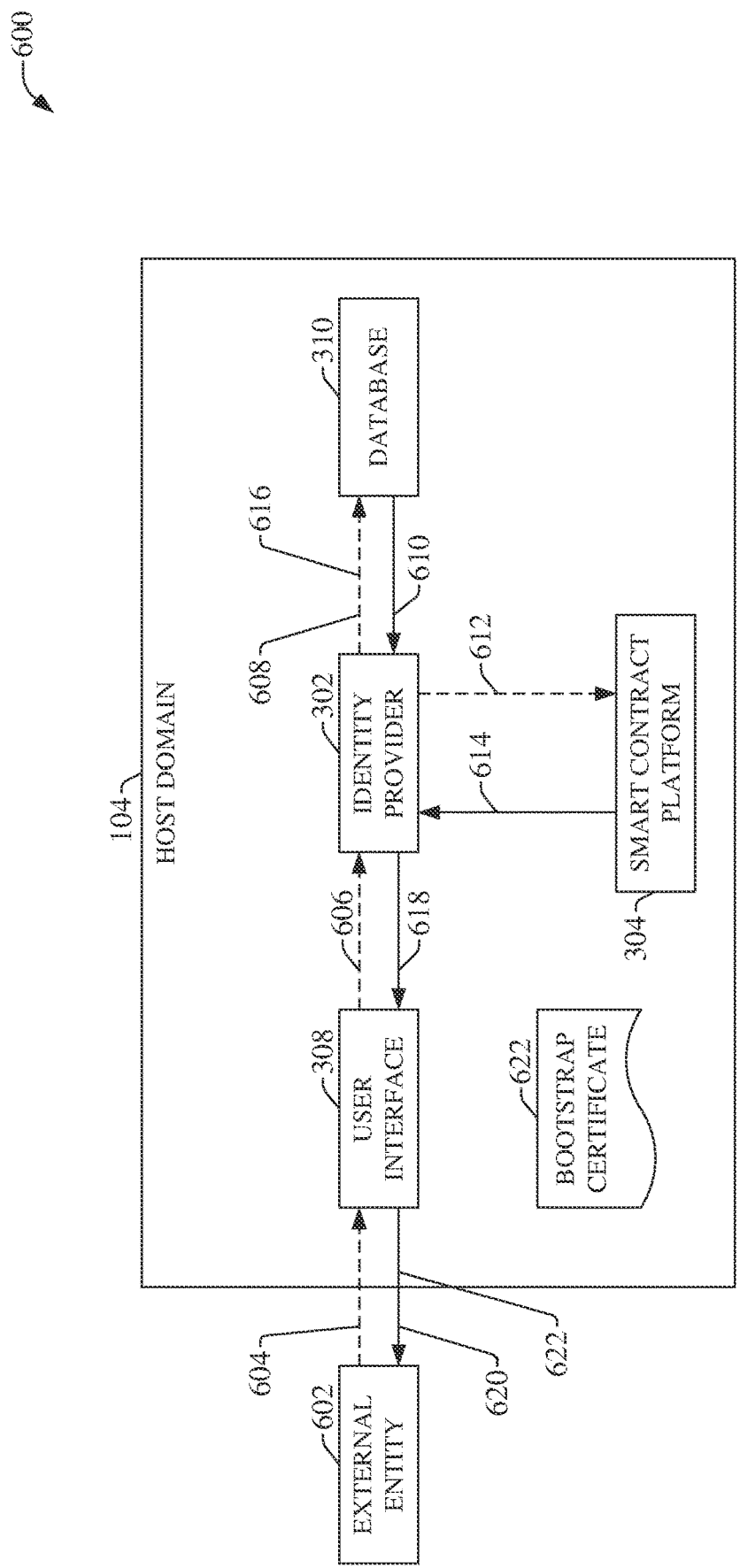
FIG. 6 depicts a schematic block flow diagram 600 illustrating an example flow process for utilizing smart contracts in connection with identity provider 302 in accordance with certain embodiments of this disclosure.

Turning now to FIG. 6, a schematic block flow diagram 600 is depicted illustrating an example flow process for utilizing smart contracts in connection with identity provider 302 in accordance with certain embodiments of this disclosure. Initially, external entity 602 can interact with user interface 308 of host domain 104. External entity can be any suitable entity such as an application, service, administrator, user, device, or the like.

As a representative example, external entity 602 can be a platform or domain administrator and/or an application administrator for the remote domain 106 of which external entity 602 is a part. As indicated at reference numeral 604, an administrator (or other external entity 602) can provide credentials to log into host domain 104, via user interface 308 as well as a request for registration for the same or a different external entity 602 such as registration for a cross-domain application (e.g., remote application 106). As illustrated at reference numeral 606, upon successful log in, the administrator can provide identity provider 302 with information used to register such as, e.g., a name of the application or other entity being registered, the associated domain, proof of identity (e.g., a digital certificate) or other suitable information.

At reference numeral 608, identity provider 302 can verify the application's identity by checking the provided proof of identity against registered applications in database 310. At reference numeral 610, identity provider 302 can receive a response from database 310. If the application is not registered, identity provider 302 may ask for additional information (e.g., from the domain or application administrator and/or external entity 602) or deny the registration request.

Assuming the registration request is verified, at reference numeral 612, identity provider 302 can interact with smart contract platform 304. This interaction can be, e.g., a request to execute a smart contract. Essentially, the smart contract creates a new identity for the application on the blockchain (e.g., blockchain 506). The smart contract can include the application's identity information, such as a unique identifier and proof of identity.

At reference numeral 614, smart contract platform 304 returns suitable data relating to a confirmation or rejection regarding the registration request. Upon receiving this data from smart contract platform 304, identity provider 302 can update the associated entry or entries of database 310 against the registration request. At reference numeral 620, identity provider 302 can transmit confirmation to the administrator that the application has been registered and is now able to access resources in other domains.

In some embodiments, identity provider 302 can generate bootstrap certificate 622, which can be provided to the domain administrator, e.g., upon request. In turn, the domain administrator can provide bootstrap certificate to other entities such as to remote applications 106 and/or IIoT devices 312 of the domain administrator's domain 108. It is appreciated that a given external entity 602 can manufacture or sell many thousands of a given IIoT device, which may be designed to interface with host domain 104.

Figure 7:
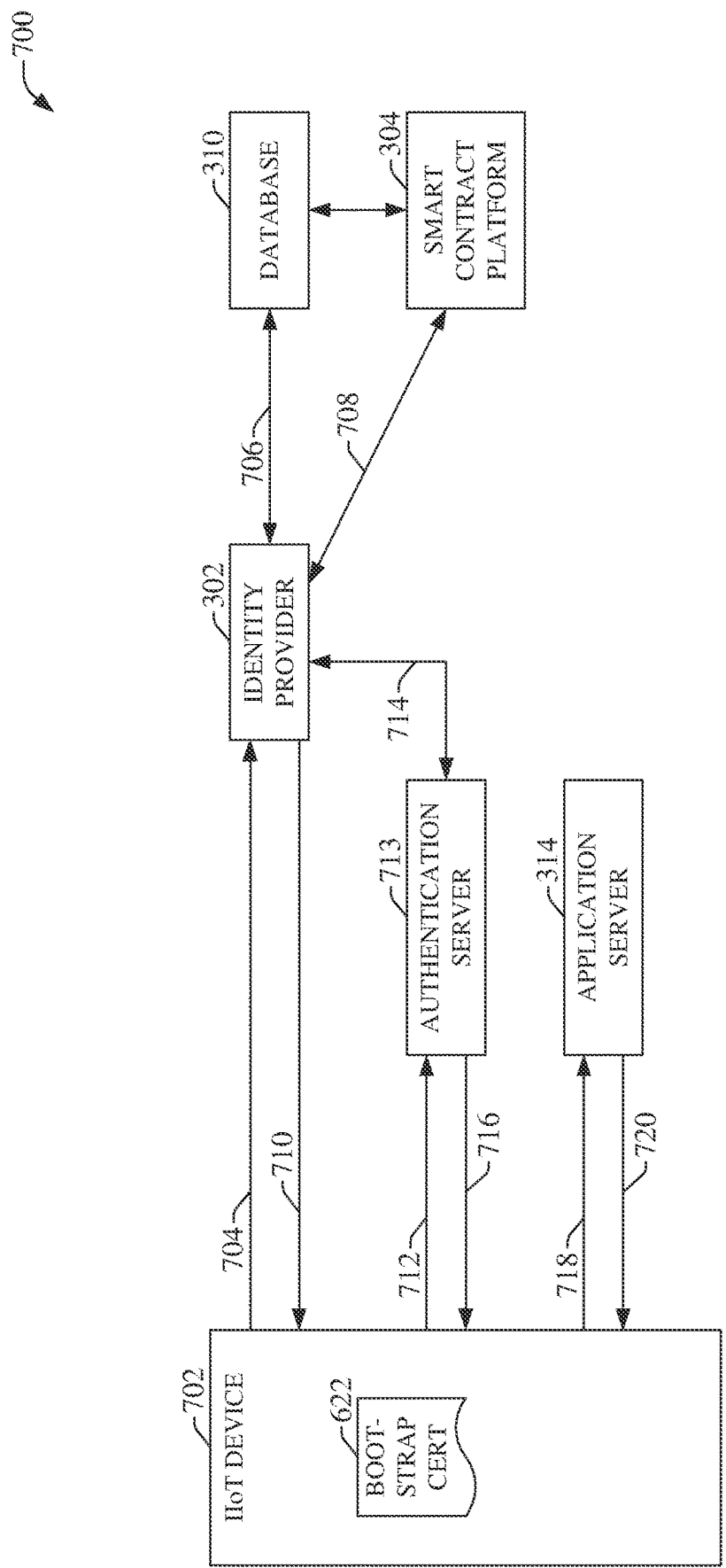
FIG. 7 depicts a schematic block flow diagram 700 illustrating an example flow process for dynamic registration with a bootstrap certificate in accordance with certain embodiments of this disclosure.

Hence, bootstrap certificate 622 can represent a certificate that is generated in advance for subsequent validation so that mass registration and authentication of many IIoT devices 312 (or other external entities 602) can be auto-on-boarded (e.g., dynamic registration without further efforts by the domain administrator). FIG. 7 can be referenced for additional detail relating to bootstrap certificate 622.

To aid in understanding, consider a real-world example in which a new application (e.g., remote application 106) is being registered. In this example, the following definitions can apply:

- A primary/host application is a host application with which secondary/remote applications will be integrated. An example can be host application 102.
- Secondary/remote application(s) can be one or more applications that integrate with the primary/host application. These applications can reside in a different domain than the host application and may or may not have authentication mechanisms in place. An example can be remote application 106.
- Domain/platform administrator can be a person or entity with admin access to the host domain's user interface (e.g., user interface 308). The host domain (e.g., host domain 104) can the identity federation platform detailed herein.

Application administrator can be a person or entity controlling or managing a secondary application of a different domain or team.

Authentication platform can comprise a user interface or web application of the IIoT cross-domain authentication platform.

Initially, the platform administrator can access the user interface (web application) provided by the authentication platform. The platform administrator can create a new application within the authentication platform used by the primary application. As one example, this can be accomplished by filling out a form or providing certain details such as an application name, a description, and other relevant information.

Once the primary application is added, the application administrator(s) can navigate to the registration section within the user interface. The application administrator can select the option to register a secondary application under the primary application. Such can be accomplished by providing the application name, description, and any other required or useful details specific to the secondary application.

During the registration process, the application administrator can provide authentication-related information for the secondary application, such as the authentication protocol being used (e.g., OAuth 2.0, OpenID Connect, or the like), the authentication server details, application programming interface (API) keys, and any other necessary or useful credentials or configurations.

The authentication platform can securely store the registration information for the primary and secondary applications. The authentication platform can associate the primary and secondary applications together using a smart contract template and adding entries in relevant database tables. Following the above registration, the secondary application is now connected to the primary application within the authentication platform.

As detailed herein, there are different scenarios regarding authentication mechanisms for the host and secondary application, which can pose security challenges. In a first scenario, both the primary and secondary applications have their own authentication mechanisms, which may differ from one another. In a second scenario, the primary application has an authentication mechanism but the secondary application does not.

In the first scenario in which both the primary and secondary applications have their own authentication mechanisms, example interactions can be according to the following. Initially, a user navigates to the primary application's login page and enters credentials such as a username and password associated with the user. The primary application's authentication mechanism verifies the user's credentials and grants access to the primary application.

Once authenticated, the user interacts with the primary application's features or elements and chooses to access a secondary application, which is integrated with the primary application. The primary application can generate an authentication token specific to the user and the secondary application that was selected by the user.

In response to the user's request to access the secondary application, the primary application can securely pass this authentication token to the user, such as by providing the authentication token to a device or application (e.g., browser) of the user.

In response to the user's browser receiving the authentication token, the browser can initiate a request to the secondary application, in which the request can comprise the authentication token such as, e.g., in headers of the request or the like.

Upon receiving the request, the secondary application can recognize the authentication token and the association with the primary application. The secondary can perform an API call to the authentication platform, which can pass the authentication token as a verification step.

The authentication platform can validate the authentication token and confirm authenticity and association with the primary application. Upon successful verification, the authentication platform can respond to the secondary application, confirming the user's authentication and providing any necessary user information such as, e.g., user roles, permissions, or the like. The secondary application can then grant access to the user, allowing the user to interact with the features or functionalities of the second application in accordance with the received user information.

With regard to the second scenario in which the primary application has an authentication mechanism but the secondary application does not, example interactions can be as follows:

The user logs into the primary application by providing credentials such as, e.g., username and password. The primary application's authentication mechanism verifies the user's credentials and grants the user access to the primary application.

Once authenticated, the user interacts with the primary application's features or elements and chooses to access a secondary application, which is integrated with the primary application. Because the secondary application does not have a security mechanism in place, the primary application can generate a secure authentication token specific to the user and the secondary application the user intends to access.

The primary application can securely pass the authentication token to the user's browser (or other suitable application or device) as a response to the request to access the secondary application. Upon receipt of the authentication token from the primary application, the browser can initiate a request to the secondary application. The request can include the authentication token in the request's headers, for example.

Since the secondary application does not include an authentication mechanism, the secondary application can receive the request and identify the authentication token. Once identified, the secondary application can rely on the authentication platform to leverage security mechanisms.

In that regard, the secondary application can perform an API call to the authentication platform, passing the received authentication token as a verification step. Upon successful verification by the authentication platform, the authentication platform can respond to the secondary application, confirming the user's authentication and providing any necessary user information such as the user roles, permissions, or the like. The secondary application grants access to the user, allowing the user to interact with features or functionalities of the secondary application according to the received user information.

Referring now to FIG. 7, a schematic block flow diagram 700 is depicted illustrating an example flow process for dynamic registration with a bootstrap certificate in accordance with certain embodiments of this disclosure. In this example, the dynamic registration is performed by IIoT device 702, but it is understood that bootstrap certificate 622 can be provided to any suitable external entity such as devices, users, applications, services, or the like.

As detailed previously, the domain administrator (or another external entity 602) can submit a mass registration request (e.g., separate from or along with registration request detailed above), which is illustrated at reference numeral 704. For example, a manufacturer may produce thousands or millions of devices (e.g., consumer or industrial devices) that will eventually need to be authenticated to some network service.

Rather than manually authenticating each device, the mass registration request can indicate a group or range of device IDs that are intended to utilize dynamic registration. In some embodiments, other information can be included such as a project identifier, a domain identifier, or the like. Identity provider 302 can receive the mass registration request and record the relevant information to database 310, which is indicated at reference numeral 706. Identity provider 302 can then submit similar information to smart contract platform 304, where similar information can be recorded to blockchain 506 and return the bootstrap certificate 622 to the domain administrator, as depicted at reference numeral 710. In some embodiments, such can be similar to the process flow detailed in connection with FIG. 6. Thereafter, the domain administrator can install the bootstrap certificate 622 to all the many IIoT devices 702.

When a given IIoT device 702 is deployed in the field, IIoT device 702 can be initialized or booted up, during which IIoT device 702 can contact authentication server 713, as shown at reference numeral 712, and provide bootstrap certificate 622, and any other suitable information such as device/project/domain IDs. Authentication server 713 can be representative of authentication server 306 or another authentication server such as one associated with the domain of IIoT device 702. At reference numeral 714, authentication server 713 can communicate with identity provider 302 and provide the bootstrap certificate 622 and the other suitable information. Identity provider 302 can then validate that IIoT device 702 is authorized or authenticated according to the registration data, and an associated authentication token can be returned to IIoT device 702 at reference numeral 716.

Subsequently, at reference numeral 718, IIoT device 702 can utilize the authentication token to access application server 314. At reference numeral 720, a authorized response can be returned by application server 314 to IIoT device 702.

Figure 8:
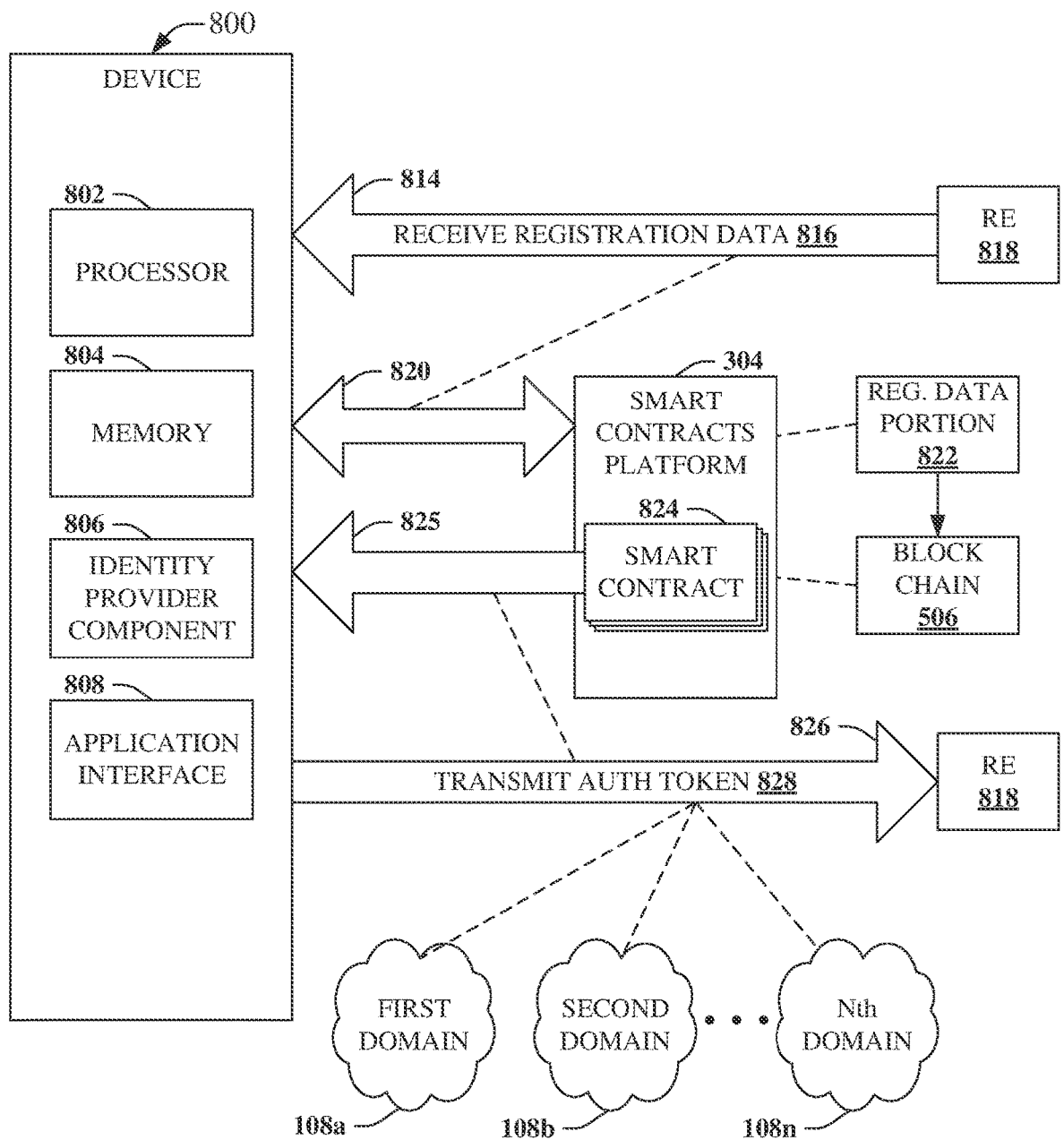
FIG. 8 depicts a schematic block diagram illustrating an example device 800 that can provide cross-domain authentication using identity federated smart contracts in accordance with certain embodiments of this disclosure.

Referring now to FIG. 8, a schematic block diagram is depicted illustrating an example device 800 that can provide cross-domain authentication using identity federated smart contracts in accordance with certain embodiments of this disclosure. In some embodiments, device 800 can be included in host domain 104. Device 800 can comprise a processor 802 that, potentially along with identity provider component 806, can be specifically configured to perform functions associated with cross-domain authentication. Device 800 can also comprise memory 804 that stores executable instructions that, when executed by processor 802, can facilitate performance of operations. Processor 802 can be a hardware processor having structural elements known to exist in connection with processing units or circuits, with various operations of processor 802 being represented by functional elements shown in the drawings herein that can require special-purpose instructions, for example, stored in memory 804 and/or identity provider component 806. Along with these special-purpose instructions, processor 802 and/or identity provider component 806 can be a special-purpose device. Further examples of the memory 804 and processor 802 can be found with reference to FIG. 13. It is to be appreciated that device 800 or computer 1312 can represent a server device or a client device of a network or network services platform of an industrial automation or IIoT domain and can be used in connection with implementing one or more of the systems, devices, or components shown and described in connection with FIG. 8 and other figures disclosed herein.

In some embodiments, identity provider component 806 can be substantially similar to identity provider 302. In some embodiments, device 800 can be embodied as identity provider 302. Device 800 can further comprise application interface 808. Application interface 808 can be configured to interface with various applications such as host application 102 and/or remote applications 106 that can be configured to functionally integrate with host application 102. In other words, application interface 808 can be configured to interface with first application 106a of first domain 108a that utilizes a first authentication protocol and interface with second application 106b of second domain 108b that does not utilize the first authentication protocol, which is further detailed in connection with FIG. 9A.

Figure 9A:
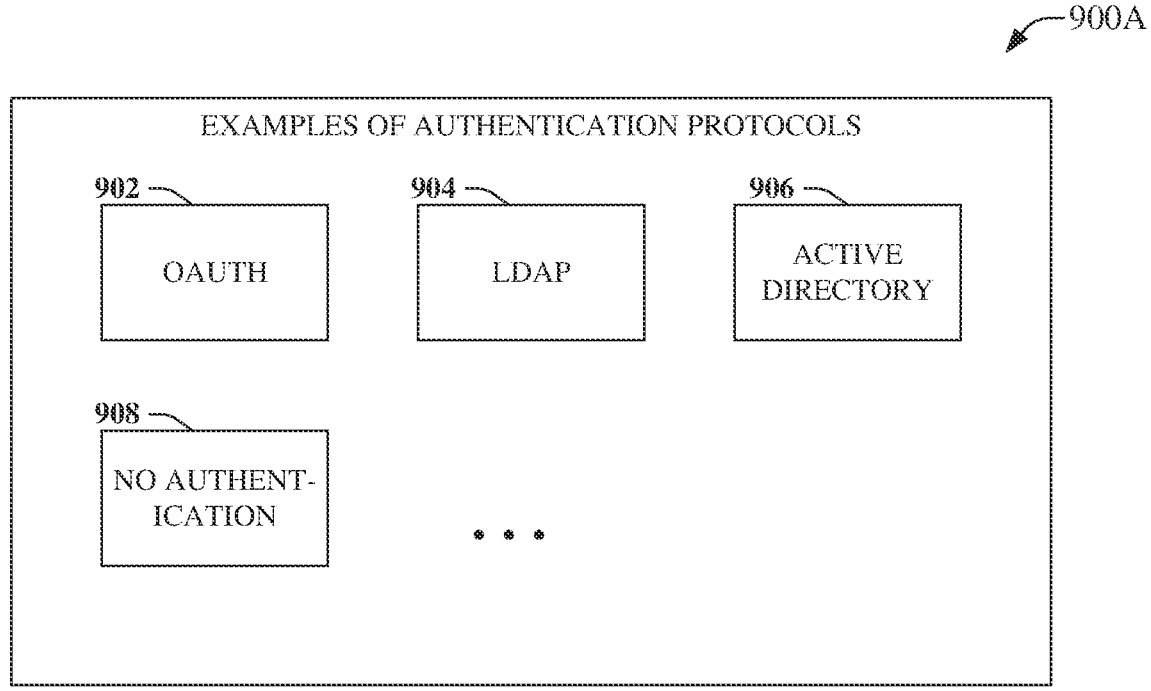
FIG. 9A depicts a block diagram 900A illustrating various examples of authentication protocols in accordance with certain embodiments of this disclosure.

FIG. 9A depicts a block diagram 900A illustrating various examples of authentication protocols in accordance with certain embodiments of this disclosure. Hence, by way of example, the first authentication protocol can be an open authorization (OAuth) protocol 902, a lightweight directory access protocol (LDAP) 904, an active directory protocol 906, or any other suitable protocol. The second authentication protocol can differ from the first authentication protocol, but otherwise can be any suitable protocol 902-906 or may use no authentication protocol 908 or otherwise have no application-level security implemented.

Still referring to FIG. 8, as indicated, device 800 can comprise identity provider component 806. As illustrated at reference numeral 814, identity provider component 806 can be configured to receive registration data 816 from a remote entity 818. In this example, remote entity 818 is first application 106a, but it is appreciated that remote entity 818 can be any remote application 106a-106n or any other suitable entity. Registration data 816 can be indicative of information to register first application 106a (or other entity) to functionally integrate with host application 102. Additional detail regarding registration data 816 can be found with reference to FIG. 9B.

Figure 9B:
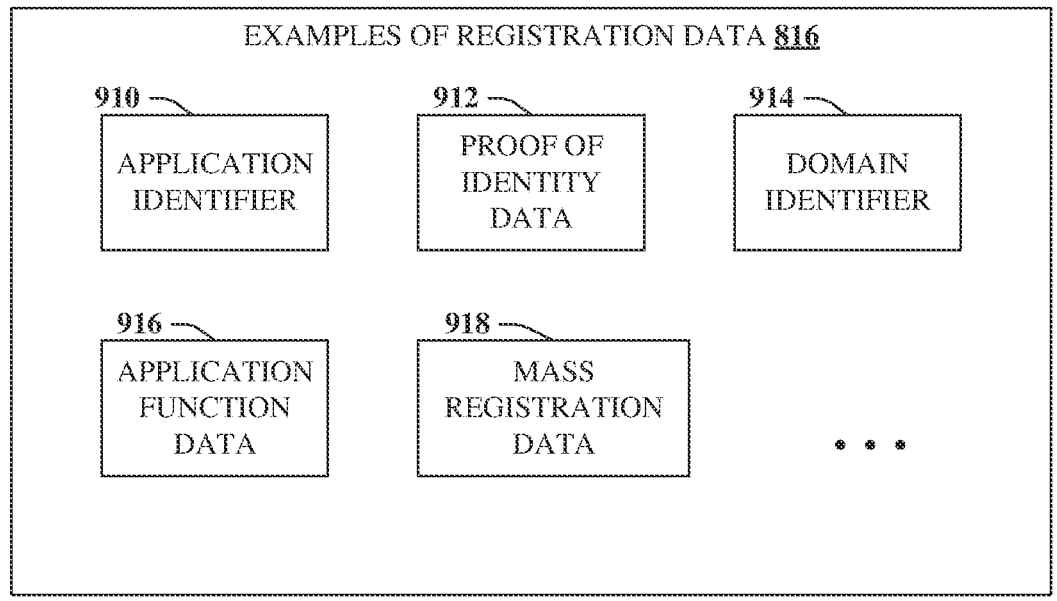
FIG. 9B depicts a block diagram 900B illustrating various examples of registration data 816 in accordance with certain embodiments of this disclosure.

FIG. 9B depicts a block diagram 900B illustrating various examples of registration data 816 in accordance with certain embodiments of this disclosure. For example, registration data 816 can comprise application identifier 910, which can, in some embodiments, uniquely identify the application (or other entity) that is being registered. Registration data 816 can comprise proof of identity data 912, which can be a certificate of some type such as, e.g., a JavaScript Object Notation (JSON) web token (JWT).

In some embodiments, registration data 816 can comprise domain identity 914 that can identify a domain associated with the entity being registered. In some embodiments, registration data 816 can comprise application function data 916. Application function data 916 can be indicative of some function element of the application or other entity being registered. For instance, such might include information relating to tasks, resource, objectives, or projects associated with the entity being registered.

In some embodiments, registration data 816 can include mass registration data 918. Mass registration data 918 can relate to data or an associated request for subsequent automatic registration of a plurality of entities such as IIoT applications or devices. Additional detail regarding mass registration data 918 or an associated bootstrap certificate can be found in connection with FIGS. 6 and 7, supra, as well as FIG. 10, below.

Still referring to FIG. 8, device 800 can be configured to interface with smart contract platform 304, as illustrated at reference numeral 820. Smart contract platform 304 can be configured to generate smart contract(s) 824, for example, by adding at least a portion 822 of registration data 816 to blockchain 506. As illustrated at reference numeral 825, smart contract(s) 824 can be provided to device 800. Based on smart contract(s) 824, device 800 can provide to remote entity 818 (e.g., first application 106*a*) authentication token(s) 828. Authentication token(s) 828 can be configured to support authenticated access across the multiple different domains such as first domain 108*a*, second domain 108*b*, and Nth domain 108*n* that can use different security techniques or have no security at all or insufficient security techniques.

Figure 10:
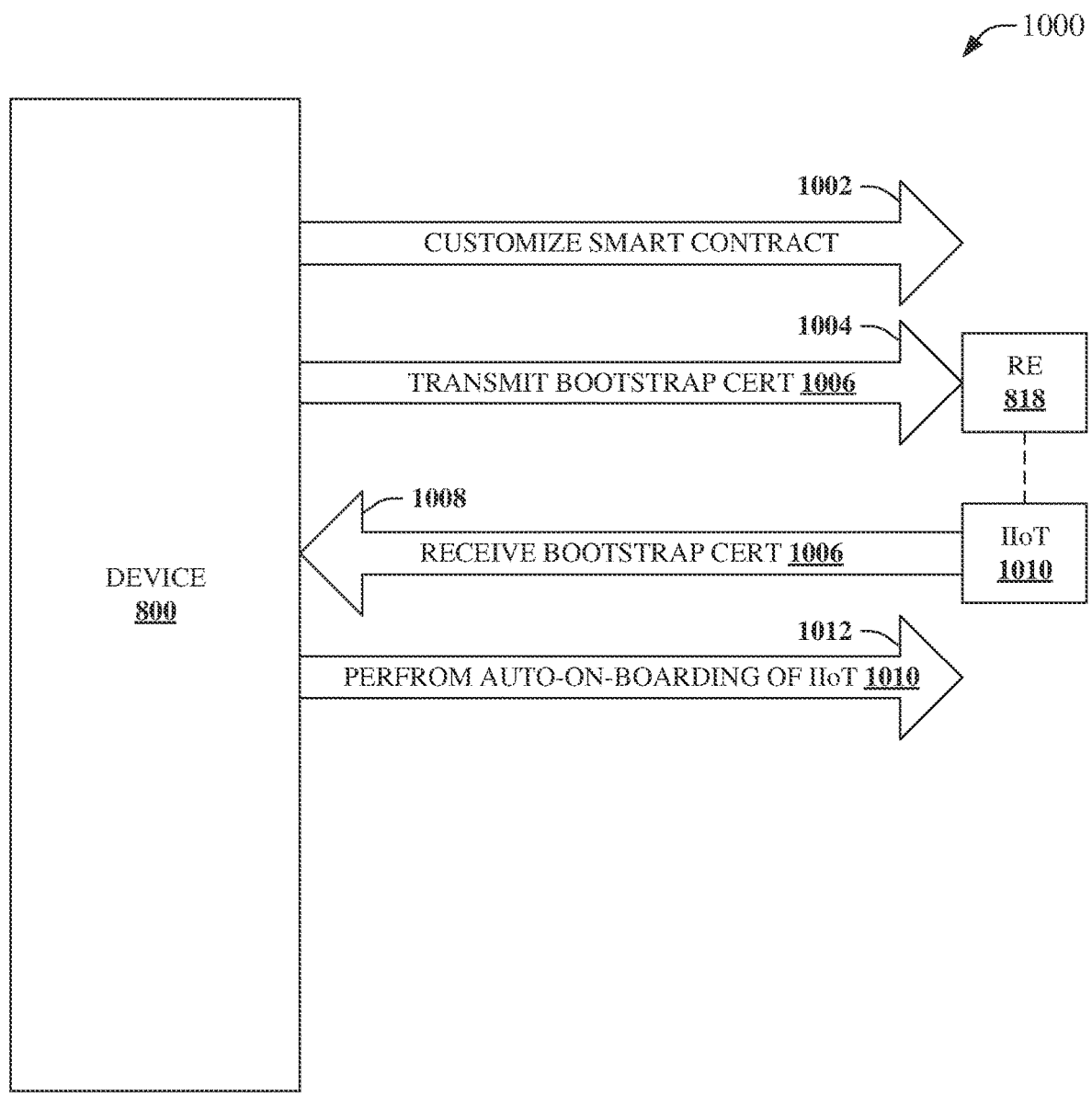
FIG. 10 depicts a schematic block diagram 1000 illustrating additional aspects or elements for providing cross-domain authentication using identity federated smart contracts in accordance with certain embodiments of this disclosure.

Turning now to FIG. 10, a schematic block diagram is depicted illustrating additional aspects or elements for providing cross-domain authentication using identity federated smart contracts in accordance with certain embodiments of this disclosure.

At reference numeral 1002, device 800 can customize smart contract(s) 824 and/or authentication token(s) 828. In some embodiments, such customization can be based on registration data 816 that can, inter alia, indicate a domain identifier data 914 and/or application function data 916.

At reference numeral 1004, device 800 can provide bootstrap certificate 1006 to remote entity 818. Bootstrap certificate 1006 can be substantially similar to bootstrap certificate 622 detailed in connection with FIG. 6. In some embodiments, bootstrap certificate 1006 can be provided in response to a mass registration request, which was detailed with reference to FIG. 6.

At reference numeral 1008, device 800 can receive bootstrap certificate 1006 from IIoT device 1010 or another suitable entity. In response, as indicated at reference numeral 1012, device 800 can perform an auto-on-boarding process for IIoT 1010, which was detailed in connection with FIG. 7.

Example Methods

Figure 11:
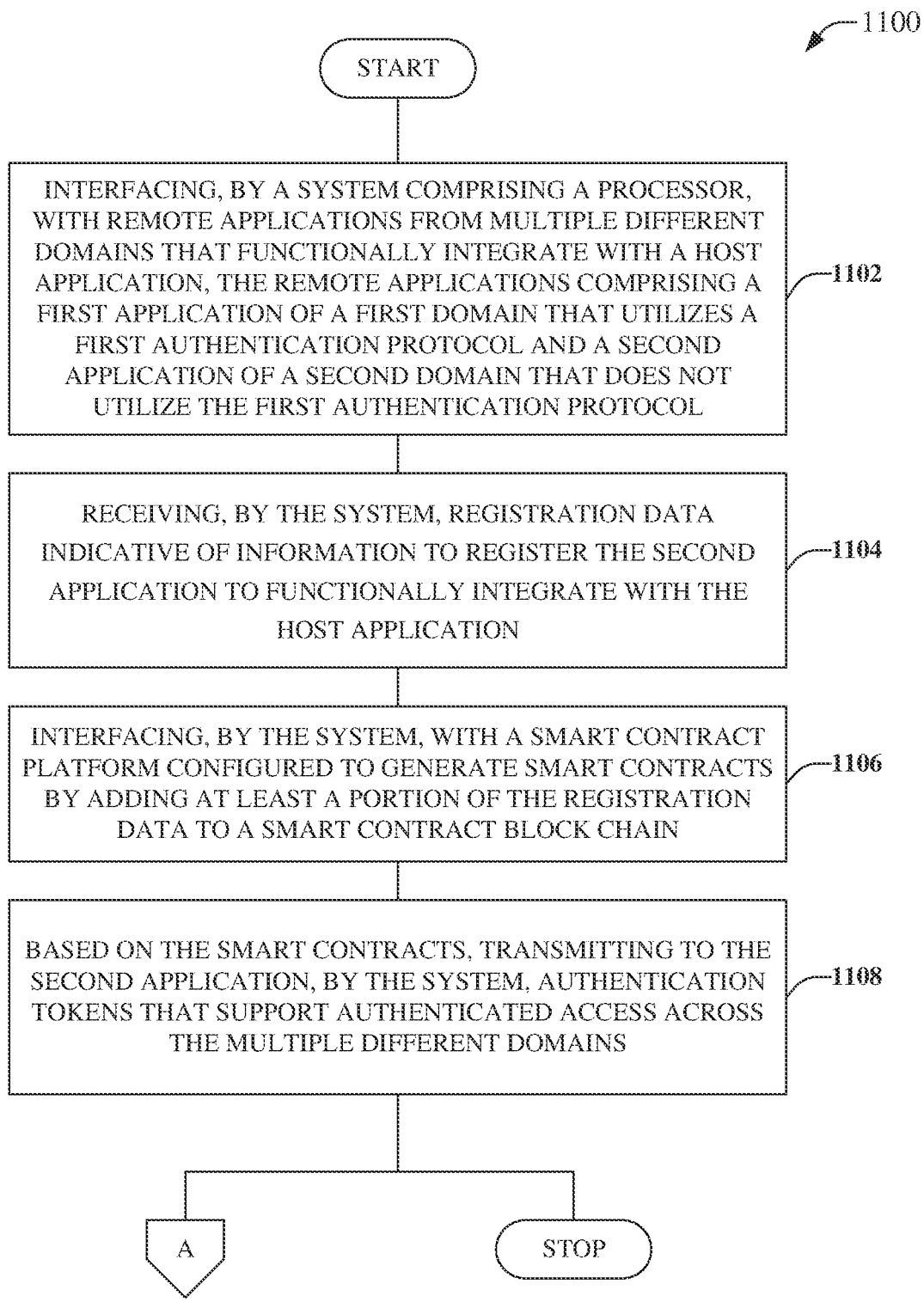
FIG. 11 illustrates an example method 1100 that can provide cross-domain authentication using identity federated smart contracts in accordance with certain embodiments of this disclosure.
Figure 12:
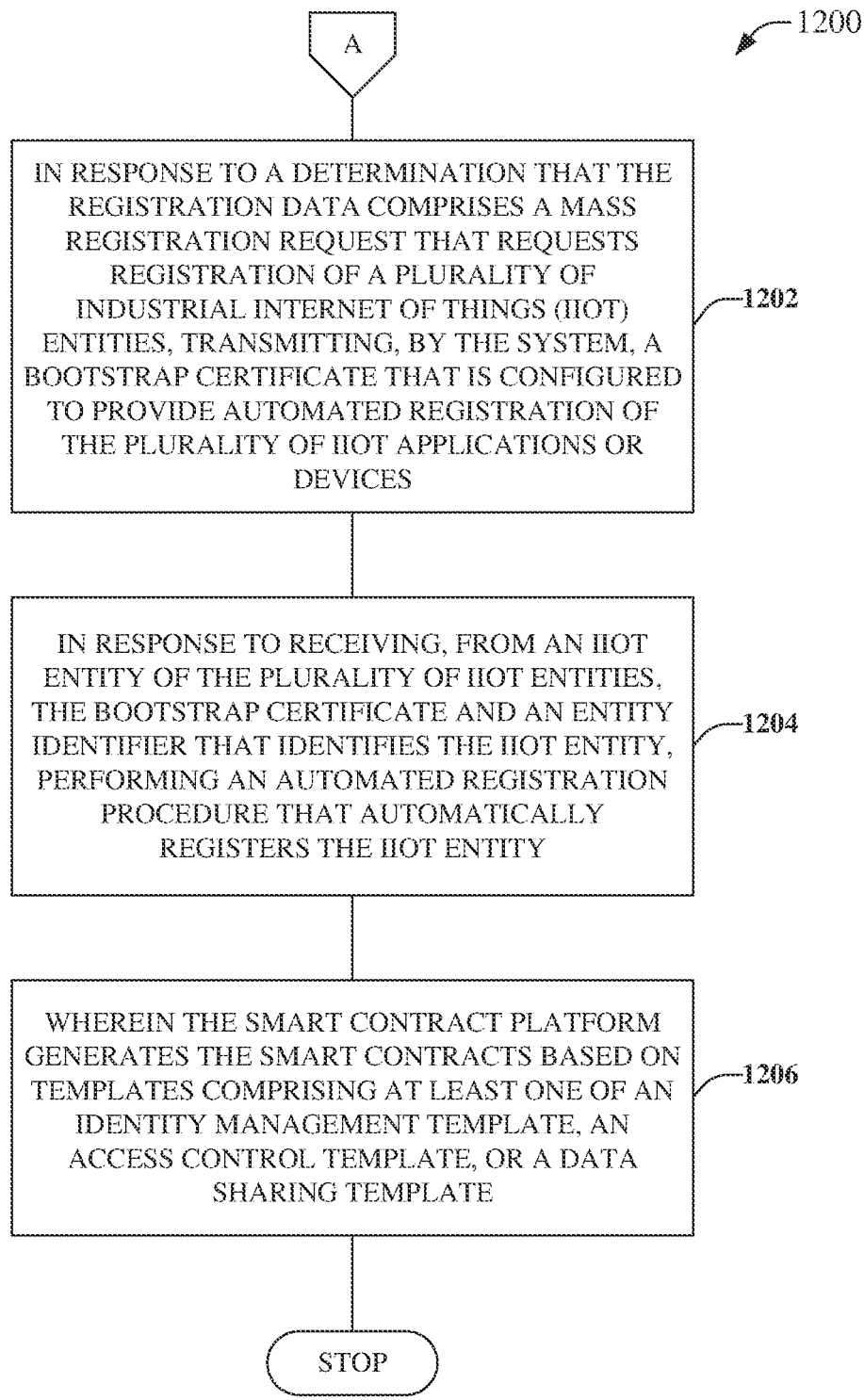
FIG. 12 illustrates an example method 1200 that can provide for additional aspect or elements in connection with cross-domain authentication using identity federated smart contracts in accordance with certain embodiments of this disclosure.

FIGS. 11 and 12 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 11, exemplary method 1100 is depicted. Method 1100 can provide cross-domain authentication using identity federated smart contracts in accordance with certain embodiments of this disclosure. While method 1100 describes a complete method, in some embodiments, method 1100 can include one or more elements of method 1200, as illustrated by insert A.

At reference numeral 1102, a system comprising a processor can interface with multiple remote applications. These remote applications can be from multiple different domains that are intended to functionally integrate with a host application (e.g., of a host domain). For instance, the remote applications can comprise a first application of a first domain that utilizes a first authentication protocol and a second application of a second domain that does not utilize the first authentication protocol.

At reference numeral 1104, the system can receive registration data indicative of information to register the second application to functionally integrate with the host application. Various non-limiting examples of the registration data can be found with reference to FIG. 9A.

At reference numeral 1106, the system can interface with a smart contract platform. The smart contract platform can be configured to generate smart contracts by adding at least a portion of the registration data to a smart contract blockchain.

At reference numeral 1108, the system can transmit authentication tokens to the second application. The authentication tokens can be based on the smart contracts and can be configured to support authenticated access across the multiple different domains. Method 1100 can terminate or proceed to insert A, which is further detailed in connection with FIG. 12.

Turning now to FIG. 12, exemplary method 1200 is depicted. Method 1200 can provide for additional aspect or elements in connection with cross-domain authentication using identity federated smart contracts in accordance with certain embodiments of this disclosure.

At reference numeral 1202, the system introduced at reference numeral 1102 comprising a processor can perform additional functional elements. For instance, in response to a determination that the registration data comprises a mass registration request, the system can transmit a bootstrap certificate to the requesting entity. In some embodiments, the mass registration request can request registration of a plurality of industrial internet of things (IIoT) entities. In some embodiments, the bootstrap certificate can be configured to provide automated registration of the plurality of IIoT applications or devices.

At reference numeral 1204, in response to receiving, from an IIoT entity of the plurality of IIoT entities, certain data, including for instance the bootstrap certificate and an entity identifier that identifies the IIoT entity, the system can perform an automated registration procedure that automatically registers the IIoT entity.

At reference numeral 1206, the smart contract platform generates the smart contracts based on templates comprising at least one of an identity management template, an access control template, or a data sharing template, which was further detailed in connection with FIG. 5.

Example Operating Environments

Figure 13:
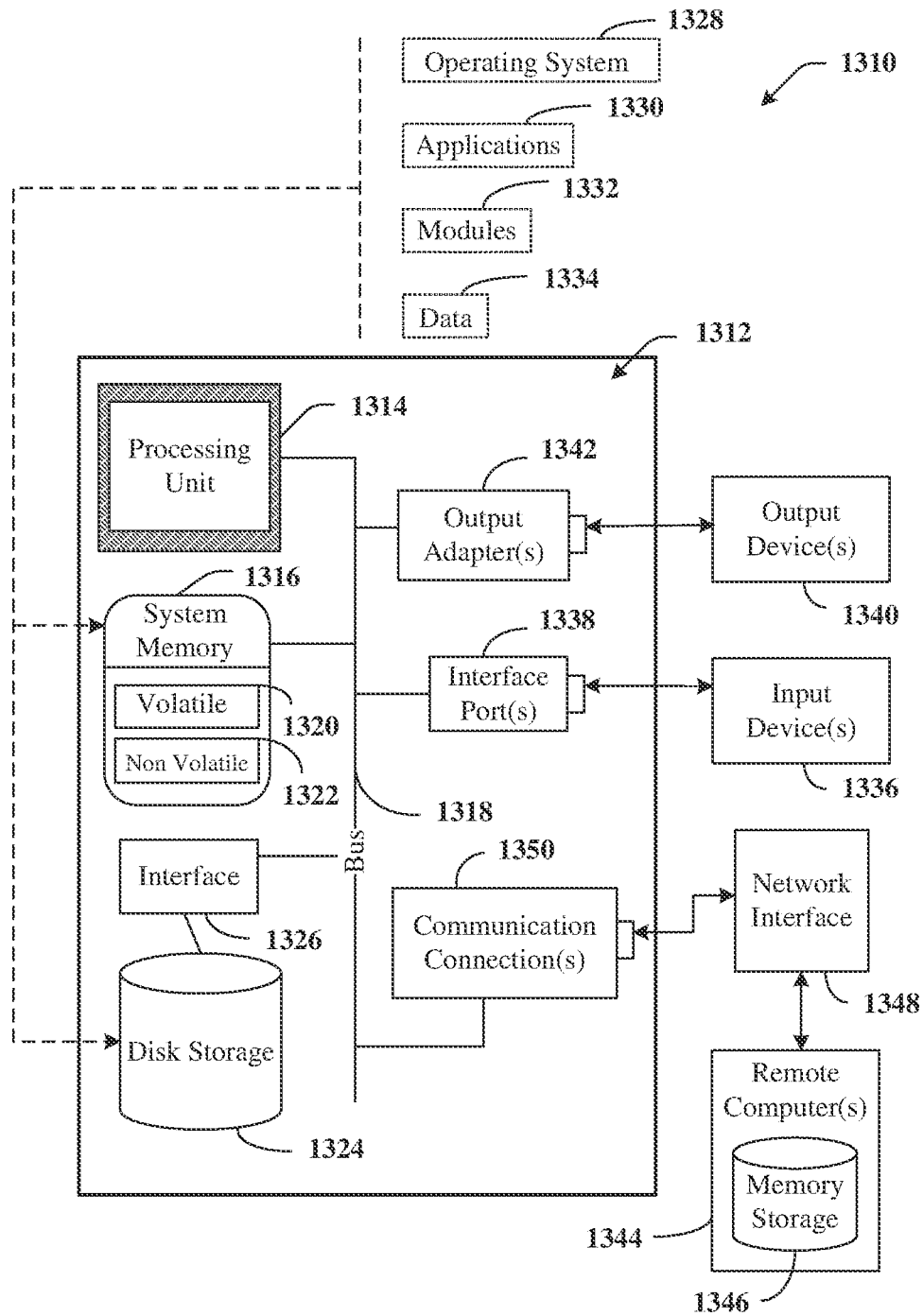
FIG. 13 is an example computing environment in accordance with certain embodiments of this disclosure.
Figure 14:
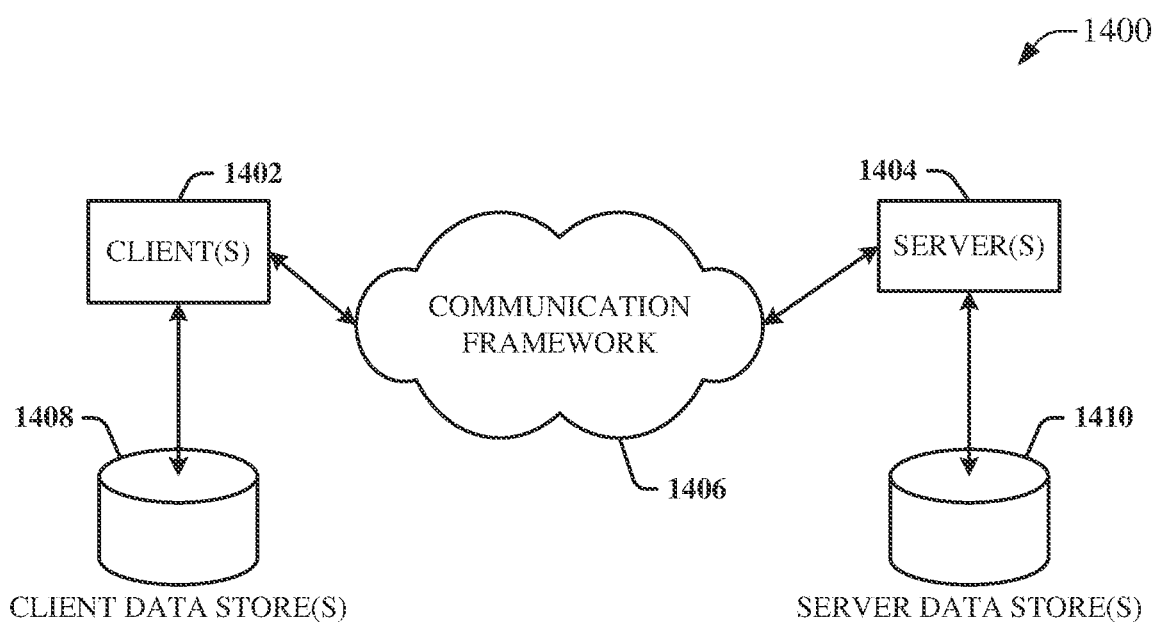
FIG. 14 is an example networking environment in accordance with certain embodiments of this disclosure.

In order to provide a context for the various aspects of the disclosed subject matter, FIGS. 13 and 14 as well as the following discussion are intended to provide a brief, general description of a suitable environment in which the various aspects of the disclosed subject matter may be implemented.

With reference to FIG. 13, an example environment 1310 for implementing various aspects of the aforementioned subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Multicore microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable PROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer 1312. System applications 1330 take advantage of the management of resources by operating system 1328 through program modules 1332 and program data 1334 stored either in system memory 1316 or on disk storage 1324. It is to be appreciated that one or more embodiments of the subject disclosure can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapters 1342 are provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1348 can also encompass near field communication (NFC) or Bluetooth communication.

Communication connection(s) 1350 refers to the hardware/software employed to connect the network interface 1348 to the system bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

FIG. 14 is a schematic block diagram of a sample computing environment 1400 with which the disclosed subject matter can interact. The sample computing environment 1400 includes one or more client(s) 1402. The client(s) 1402 can be hardware and/or software (e.g., threads, processes, computing devices). The sample computing environment 1400 also includes one or more server(s) 1404. The server(s) 1404 can also be hardware and/or software (e.g., threads, processes, computing devices). The servers 1404 can house threads to perform transformations by employing one or more embodiments as described herein, for example. One possible communication between a client 1402 and servers 1404 can be in the form of a data packet adapted to be transmitted between two or more computer processes. The sample computing environment 1400 includes a communication framework 1406 that can be employed to facilitate communications between the client(s) 1402 and the server(s) 1404. The client(s) 1402 are operably connected to one or more client data store(s) 1408 that can be employed to store information local to the client(s) 1402. Similarly, the server(s) 1404 are operably connected to one or more server data store(s) 1410 that can be employed to store information local to the servers 1404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a memory that stores executable components; and
   a processor, operatively coupled to the memory, that executes the executable components, the executable components comprising:
   an application interface component configured to interface with remote applications from multiple different domains that functionally integrate with a host application, the remote applications comprising a first application of a first domain that utilizes a first authentication protocol and a second application of a second domain that does not utilize the first authentication protocol; and
   an identity provider component configured to:
   receive registration data indicative of information to register the first application to functionally integrate with the host application;
   interface with a smart contract component configured to generate smart contracts by adding at least a portion of the registration data to a smart contract block chain, wherein the smart contracts are parameterized using the registration data; and
   based on the smart contracts, providing, to the first application, authentication tokens that support authenticated access across the multiple different domains.

2. The system of claim 1, wherein the first authentication protocol is selected from a group comprising an open authorization (OAuth) protocol, a lightweight directory access protocol (LDAP), or an active directory protocol.

3. The system of claim 1, wherein the second application utilizes a second authentication protocol is selected from a group comprising an open authorization (OAuth) protocol, a lightweight directory access protocol (LDAP), or an active directory protocol.

4. The system of claim 1, wherein the second application does not utilize any authentication protocol.

5. The system of claim 1, wherein the registration data comprises an application identifier for the first application, proof of identity data for the first application, a domain identifier for the first domain, or application function data indicative of a functional element of the first application.

6. The system of claim 5, wherein the smart contracts and/or authentication tokens are customizable based on the registration data.

7. The system of claim 1, wherein the registration data further comprises a mass registration request that requests registration of a plurality of industrial internet of things (IIoT) applications or devices.

8. The system of claim 7, wherein the identity provider component, in response to receiving the mass registration request, facilitates generation of a bootstrap certificate that is configured to provide automated registration of any of the plurality of IIoT applications or devices.

9. The system of claim 1, further comprising the smart contract component.

10. The system of claim 9, wherein the smart contract component comprises a smart contract library comprising a group of templates that are used to generate the smart contracts.

11. The system of claim 10, wherein the group of templates comprises at least one of an identity management template, an access control template, and a data sharing template.

12. The system of claim 1, wherein the identity provider component comprises at least one of:
   an identity management component configured to manage and store identity information for an application, a device, or a user and further configured to facilitate registration, authentication, and de-registration of the application, the device, or the user;
   an identity verification component configured to verify an identity of the application, the device, or the user;
   an identity federation component configured to federate the identity across the multiple different domains;

a smart contract interface component configured to communicate with the smart contract component and to execute the smart contracts;

a compliance component configured to ensure the identity provider operates within defined regulations or standards for data protection or identity management; or an identity synchronization component configured to synchronize the identity across the multiple different domains.

13. A method, comprising:

interfacing, by a system comprising a processor, with remote applications from multiple different domains that functionally integrate with a host application, the remote applications comprising a first application of a first domain that utilizes a first authentication protocol and a second application of a second domain that does not utilize the first authentication protocol;

receiving, by the system, registration data indicative of information to register the second application to functionally integrate with the host application;

interfacing, by the system, with a smart contract platform configured to generate smart contracts by adding at least a portion of the registration data to a smart contract block chain parameterized according to the registration data; and based on the smart contracts, transmitting to the second application, by the system, authentication tokens that support authenticated access across the multiple different domains.

14. The method of claim 13, further comprising in response to a determination that the registration data comprises a mass registration request that requests registration of a plurality of industrial internet of things entities, transmitting, by the system, a bootstrap certificate that is configured to provide automated registration of the plurality of IIOT applications or devices.

15. The method of claim 14, further comprising in response to receiving, from an IIOT entity of the plurality of IIOT entities, the bootstrap certificate and an entity identifier that identifies the IIOT entity, performing an automated registration procedure that automatically registers the IIOT entity.

16. The method of claim 13, wherein the smart contract platform generates the smart contracts based on templates comprising at least one of an identity management template, an access control template, or a data sharing template.

17. A non-transitory computer-readable medium having stored thereon instructions that, in response to execution, cause a system comprising a processor to perform operations, the operations comprising:

interfacing with a remote application of a group of remote applications from multiple different domains that functionally integrate with a host application, the remote applications comprising a first application of a first domain that utilizes a first authentication protocol and a second application of a second domain that does not utilize the first authentication protocol;

receiving registration data indicative of information to register the remote application to functionally integrate with the host application;

interfacing with a smart contract platform configured to generate smart contracts by adding at least a portion of the registration data to a smart contract block chain, wherein the smart contracts are parameterized using the registration data; and based on the smart contracts, transmitting to the remote application authentication tokens that support authenticated access across the multiple different domains.

18. The non-transitory computer-readable medium of claim 17, wherein the registration data comprises an application identifier for the remote application, proof of identity data for the remote application, a domain identifier for a domain of the remote application, or application function data indicative of a functional element of the remote application.

19. The non-transitory computer-readable medium of claim 17, wherein the operations further comprise in response to receiving a mass registration request that requests registration of a plurality of industrial internet of things (IIOT) entities, facilitating generation of a bootstrap certificate that is configured to provide automated registration of any of the plurality of IIOT entities.

20. The non-transitory computer-readable medium of claim 17, wherein the smart contract platform generates the smart contracts based on templates comprising at least one of an identity management template, an access control template, or a data sharing template.

* * * * *